Nov. 29, 1927.                                                        1,651,267
H. C. GERAN
SHIPPING CRATE
Original Filed Dec. 1, 1925

Inventor
Henry C. Geran
By
James L. Norris
Attorney

Patented Nov. 29, 1927.

1,651,267

UNITED STATES PATENT OFFICE.

HENRY C. GERAN, OF MATAWAN, NEW JERSEY.

SHIPPING CRATE.

Application filed December 1, 1925, Serial No. 72,508. Renewed December 16, 1926.

This invention relates to shipping crates of the ventilated or slotted type and which are particularly adapted for fruits or vegetables that are apt to become injured and rendered unmarketable during transportation.

The main object of the present invention is to provide a crate of such structure as to remove all possibility of crushing or damaging the contents of the crate when a number of the latter are stacked or arranged in tiers.

A further object of the invention is to provide a crate having a top so constructed as to permit ready removal and access to the contents of the crate, and also having ventilating openings but preventing the upper layer of fruit or vegetables which is exposed through the ventilating openings or spaces between the crates from being injured by crushing contact with a superposed crate, and also during removal of a top slat to gain access to the contents of the crate.

A further general object of the invention is to provide a crate having a top which is constructed for convenience in applying the top slats and disposing the latter in partial overlapped edge relation but at the same time forming ventilating openings between the slats and also producing a guard structure at opposite sides of the longitudinal center of the top which will preclude all possibility of engagement with the fruit or vegetables at the top of the crate by objects that may be disposed on the crate top.

With the foregoing and other objects and advantages in view, the invention consists in the construction and arrangement of the several parts which will be more fully hereinafter described and claimed.

Figure 1:
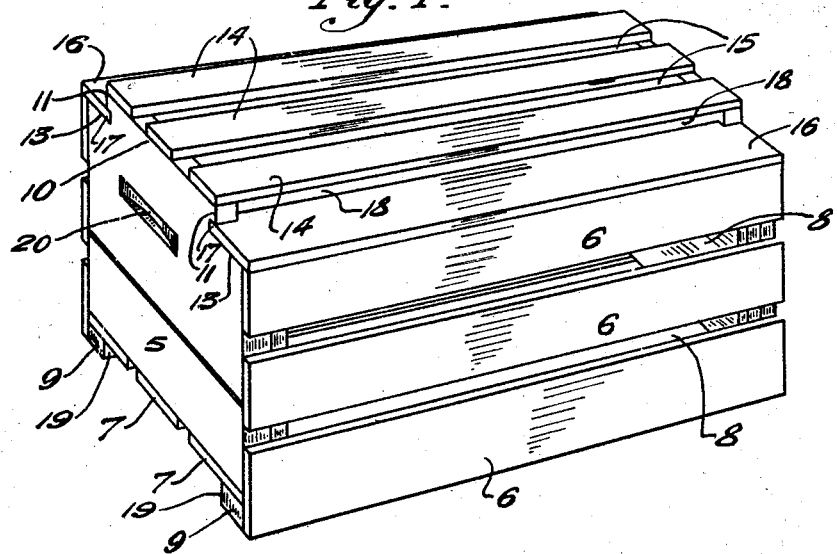
Fig. 1 is a perspective view of a crate embodying the features of the invention.
Figure 2:
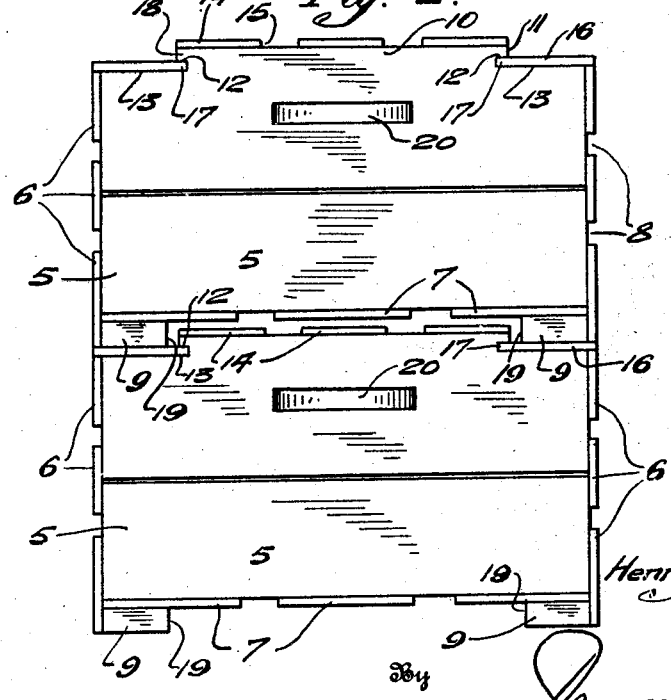
Fig. 2 is an end elevation of the crate.

The improved crate comprises ends 5, which are made up of relatively thick material and have side and bottom slats 6 and 7 applied thereto in spaced relation to form ventilating openings 8. As is customary in crate constructions of this type, runners or sills 9 are applied to the bottom against the outermost slats 7 of the said bottom and flush with the lowermost slats 6 of the sides of the crate. The ends 5 may be made up from any suitable number of strips or pieces of requisite width and which will be determined in accordance with the general proportions and dimensions of the crate, and further the slats 6 and 7 may be increased in number relatively to the general dimensions of the crate as found necessary and desirable. The top portion of the ends 5 of the crate are formed with central extensions 10 which are of less length than the length of the ends and terminate in vertically straight shoulders 11. The extensions directly under the shoulders are undercut as at 12, and the bases of these undercut portions are in the form of horizontal ledges 13, which extend fully outwardly to the end edges of the ends 5. The top of the crate in the present instance comprises the extensions 10, which have slats 14 secured thereon and spaced to form ventilating openings 15, the outer edges of the outermost slats being flush with the shoulders 11. Three of the slats 14 are shown in the present instance, but it will be understood that this number may be varied. The top structure of the crate also includes horizontally disposed slats or strips 16, which are applied to and secured on the ledges 13, the inner ends 17 of the said slats 16 being seated in the undercut portions or seats 12, the outer side edges of these slats being flush with the outer surfaces of the upper slats 6 of the sides of the crate. In accordance with the arrangement just described, it will be seen that the outer edge portions of the top slats 14 extend over or overlap the inner edges 17 of the slats 16 with an opening 18 between the outer edges of the slats 14 and inner edges of the slats or strips 16 engaging the undercut portions or seats 12. Furthermore, between the outer edges of the slats 14 and the lower adjacent portions of the slats 16 the vertically straight shoulder formation is preserved, and the openings 18 at opposite side portions of the extension 10 between the outer edges of the slats 14 and the inner edges of the slats 16 will preclude any possibility of the fruit or vegetables in the crate from being disposed for engagement or contact through the said openings 18, and as a consequence, when the crates are stacked or arranged in tiers, the runners or sills 9 will rest on the upper surfaces of the slats or strips 16 and the inner side edges 19 of the said runners or sills will squarely contact or engage the shoulders 11, and no matter how much the said runners or sills shift inwardly on the slats or strips 16 which provide supporting ledges therefor, the inner side edges of the runners or sills cannot engage the contents of the crate at the top portion of the latter. Another advantage of the undercut portions or seats 12 is that they facilitate application and securely hold the slats or strips 16 at the inner edges of the latter and make it possible to reduce the number of fastening devices for securing the slats or strips 16 on the ledges 13. The inner edges 17 of the slats or strips 16 are also protected by the overlapped arrangement above specified, or the extension of said edges 17 inwardly beyond the side edges of the slats 14 applied to the upper edge of the extension 10.

As usual in crate structures of this type, the ends 5 have openings 20 for convenience in inserting the fingers of the hand when lifting the crates, or to provide means for easily gripping the ends of the crates, and it will be understood that the other usual features of crates of this general type will be adopted and any suitable means employed for fastening the slats in place. The runners or sills 9 in crates of this type are usually of less width than the ledges on which they rest, so that the stacked or tiered crates may be readily arranged one upon the other without the least obstruction.

What is claimed as new is:

1. A crate wherein the body and top members are fixed, and comprising opposite ends with vertical central extensions to receive top closing slats, the opposite terminals of said extensions adjacent to the sides of the crate being formed with vertically straight shoulders, and top side closing slats at a lower level than the slats engaging the upper edges of the extensions and partially inserted into the opposite terminals of the extensions inwardly beyond the side outer edges of the top slats secured to said extensions, ventilating openings being formed between the side slats and those secured to the top edges of the extensions, whereby contact with the contents of the crate at the top by means disposed on the crate top at opposite sides of the said extension is prevented.

2. A crate having a body comprising ends with upper centrally located extensions, fixed top slats secured on the upper edges of said extensions, and other horizontally disposed fixed closing slats below the upper edges of the extensions and having their outer edges terminating flush with the sides of the crate, the inner edges of the said horizontal closing slats being inserted under the opposite terminals of the extensions far enough to prevent contact and injury to the contents of the crate at the top of the latter.

3. A crate comprising a body including ends having top vertical extensions having opposite terminals at a distance inwardly from the sides of the crate, top slats secured to the upper edges of said extensions, and other slats secured to the top of the crate below the upper edges of the extensions and having their inner edges projected inwardly beyond the outer side edges of the outermost slats on the upper edges of the extensions to prevent engagement with the contents of the crate at the top by objects engaging opposite side portions of the said top at the terminals of the extensions.

4. A crate comprising a body having ends with top central extensions formed with opposite vertically straight shoulders and undercut seats continuing into opposite outwardly projecting side ledges, slats fixed to the top edges of said extensions, the side outer slats mounted on said ledges having their edges flush with the shoulders and wider slats secured on the ledges and having their inner edges extending into the seats and overlapped by the outer side edges of the outer slats on the extensions above to prevent engagement of the contents of the crate by objects disposed on the side portions of the crate.

In testimony whereof I have hereunto set my hand.

HENRY C. GERAN.